United States Patent [19]

Bergan

[11] 4,262,559
[45] Apr. 21, 1981

[54] METHOD FOR FABRICATING IMPROVED CUTTER CONES FOR A FOOD PROCESSING MACHINE

[75] Inventor: Norman A. Bergan, Dallas, Tex.

[73] Assignee: Dimark, Inc., Dallas, Tex.

[21] Appl. No.: 967,419

[22] Filed: Dec. 7, 1978

[51] Int. Cl.³ .................... B21K 21/00; B24B 1/00
[52] U.S. Cl. .................................... 76/101 A; 51/324
[58] Field of Search .......... 76/101 A, 101 SM, 24 R; 241/93; 144/176, 172; 51/288, 324

[56] References Cited

U.S. PATENT DOCUMENTS

| | | | |
|---|---|---|---|
| 962,239 | 6/1910 | McFadden et al. | 241/282.1 |
| 1,618,935 | 2/1927 | Kushnier | 241/93 |
| 2,670,019 | 2/1954 | Cuyler | 241/93 |
| 3,289,497 | 12/1966 | West | 76/101 SM |
| 3,680,798 | 8/1972 | Moser | 241/93 |

FOREIGN PATENT DOCUMENTS 480268  1/1952  Canada .................................. 241/93

Primary Examiner—Nicholas P. Godici
Assistant Examiner—Boscoe V. Parker
Attorney, Agent, or Firm—Richards, Harris & Medlock

[57] ABSTRACT

The specification discloses a method for constructing an improved cutter cone (12) for a food processing machine (10). A plurality of elongated slits (32) are cut axially along the surface of the frustroconical surface (40). A selected edge of each of the slits (32) is bent internally of the conical surface (40) at a predetermined angle to the cone to form a louvered surface (42). The inside of each louvered surface (42) is ground by means of an emery wheel to form a cutting edge (36). Each louvered surfaces (42) is then bent outwardly of the conical surface (40) at a predetermined angle to form a series of working surfaces each having an interiorly beveled cutting edge (36). The exterior of the working surfaces (34) is then polished by means of a buffing wheel to eliminate burrs.

2 Claims, 5 Drawing Figures

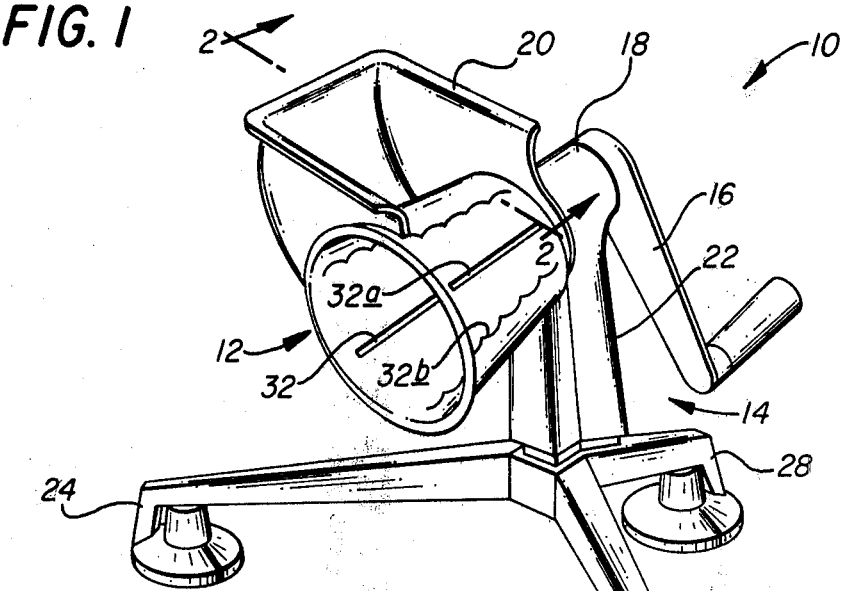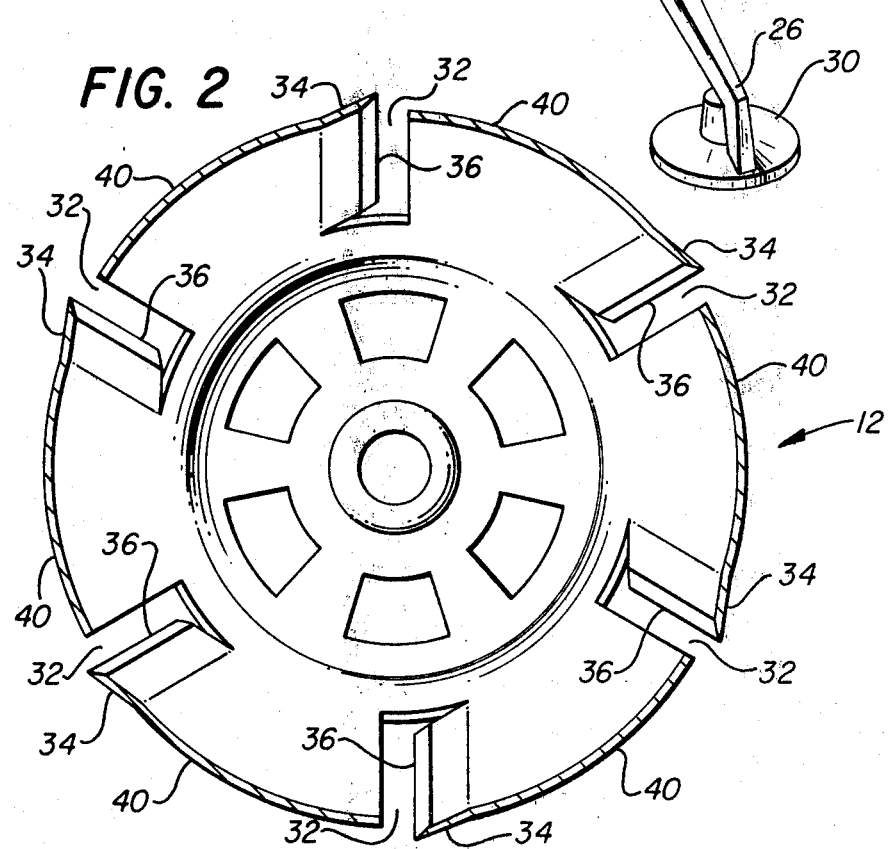

METHOD FOR FABRICATING IMPROVED CUTTER CONES FOR A FOOD PROCESSING MACHINE

TECHNICAL FIELD

This invention relates to food processing machinery and more particularly to methods for constructing and fabricating improved cutting cones for food processing machines.

BACKGROUND ART

In certain food processing machines for domestic use, the food to be cut or chopped is placed into a hopper where it comes into contact with a rotating cutting cone driven by a crank. The cutter cones used in such devices are typically of frustroconical shape having a series of elongated slits cut axially along the surface thereof with one edge of each slit sharpened and bent outwardly of the surface for slicing or cutting food in the hopper. In the conventional method for constructing these cones, the edge of each slit which will come into contact with the food as the cone is rotated is bent outwardly of the conical surface to form a working surface and the exterior side of the working surface is beveled to a cutting edge. Burrs formed on the inside of the working surface during the grinding step are then removed and the cutting edges are polished.

When contrasted with cones constructed in accordance with the present invention, cutter cones of this construction are somewhat inefficient in the processing of food because the working surface beveled from the outside of the working surface to form a cutting edge has a tendency to push food away as it comes into contact. Moreover, a disadvantage of constructing such cones by the conventional process compared with the process of this invention is that when the exterior of the working surface is ground to form the cutting edge, burrs will be formed on the inside of the working surface between the cutting edge and the conical surface. Since there is very little clearance between the working surface and conical surface, it is difficult to remove these burrs and hand machining may be required, which increases the labor and cost of the process.

DISCLOSURE OF THE INVENTION

In accordance with the present invention, a novel method is disclosed for fabricating an improved cutter cone for food processing machines.

According to one embodiment of the invention, a plurality of axially oriented elongated slits are first cut into a frustroconical surface. One edge of each of the slits is then bent internally of the conical surface at a predetermined angle to form a louvered surface. The inside of each louvered surface is next ground to form a cutting edge on the internal side thereof. Each louvered surface is next bent outwardly of the cone at a predetermined angle to form a series of working surfaces, each having an interiorly beveled cutting edge. Finally, the exterior of each working surface may be polished to remove any burrs formed thereon during the grinding step.

DESCRIPTION OF THE DRAWINGS

FIG. 1 is a perspective view of a food cutting machine showing the improved cutter cone;

FIG. 2 is a section view of the improved cutter cone of FIG. 1; and

DETAILED DESCRIPTION

Figure 3:
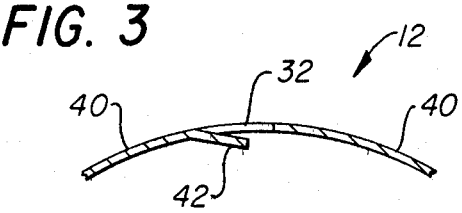
FIGS. 3-5 are partial section views of the improved cutter cone illustrating the successive steps in forming the cutting edges thereon.

FIG. 1 illustrates a conventional food cutting machine 10 showing the improved cutter cone 12 pivotally mounted thereto. A domestic food cutting machine of the type ordinarily found in home kitchens usually has some supporting structure 14 capable of supporting a pivotally mounted cutter cone 12 which is rigidly connected to a crank 16 via an axle 18. A hopper 20 is supported on the machine clear of the rotating cone but dimensioned to surround the cutter cone so that by force of gravity food is fed into contact with the cutting edges thereof.

A supporting structure 14 may be a tripodal structure, such as that shown in FIG. 1, in which an upstanding arm 22 is vertically supported by three tripodal legs 24, 26 and 28 which terminate in rubber or plastic feet 30 provided to enhance the stability of the structure on a flat surface such as a kitchen counter.

As best seen in FIG. 1, cutter cone 12 has a series of equally spaced parallel elongated slits 32 which are cut into the frustroconical surface thereof along the axial direction. Slits 32 are designed to have sufficient width such that food coming into contact and being sliced by the cutting edge thereof falls through the slit into the cutter cone. Slits 32 may be of various configurations. Some may have a relatively straight edge, such as the slit 32a shown in FIG. 1, and others may have a serrated edge such as the slit 32b also shown in FIG. 1. Normally, only one type of slit will be used in a particular cone, depending upon the type of cutting operation contemplated by the user. In practice, a variety of cutter cones having slit edges of different configuration is provided with a single food processing machine.

FIG. 2 shows a cross sectional view of the improved cutter cone 12 having a series of parallel, axially arranged, elongated slits 32 equally spaced around the conical surface. As is best seen in FIG. 2, each slit 32 has two parallel edges, one of which is outwardly bent to form a working surface 34. The edge which forms working surface 34, of course, is the edge that comes into contact with the food as the cone is rotated. In the cone shown in FIG. 2, working surface 34 is chosen for a cone designed to be rotated in the clockwise direction.

In the construction of conventional cutter cones, elongated slits are cut out of a frustroconical surface by means of a piercing die in a punch press. The edge of the slit which serves as the working surface is bent outwardly of the cone at some relatively small angle from the conical surface to form a working surface. The exterior side of the working surface is then beveled toward the conical surface to form a sharp cutting edge which comes into contact with food in the hopper, cutting or slicing the food and forcing the cut or shaved portions thereof through the slit into the interior of the cone. Because the exterior side of the working surface is ground to form a cutting edge, burrs are normally formed on the inside of the working surface during the grinding step. Prior to polishing the cutting edges, these burrs must be removed, often necessitating hand operations due to the small clearance between the conical surface and the working working surface.

The method of the present invention is designed to provide a more efficient cutter cone and to provide a superior process for construction of cutter cones. FIG. 2 shows an improved cutter cone in which the the cutting edge 36 is formed on the inside of the working surface 34. Formation of the cutting edge inside the working surface offers two advantages. First, the cutting operation is more efficiently carried out because the food is not pushed away from the cone as the cutting edge makes contact; and second, since the grinding of the cutting edge takes place on the inside of the working surface 34, burrs are formed on the exterior side of the working surface and are more easily removed by a buffing wheel or other polishing apparatus because clearance is not a problem.

Figure 4:
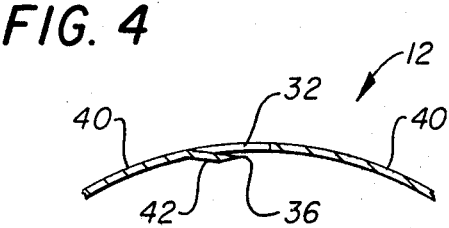
Figure 5:
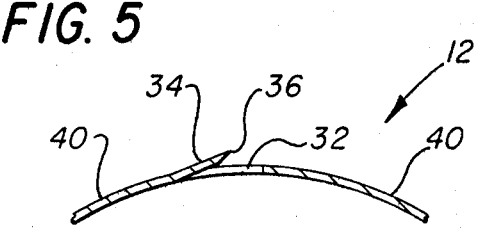

FIGS. 3-5 illustrate the method of the present invention whereby the improved cutter cone of FIG. 2 is formed.

As in the conventional method of fabricating cutter cones, a frustroconical surface 40 is first fabricated from sheet metal. A cross sectional slice of surface 40 is shown in FIGS. 3-5. As is conventional, a series of equally spaced axially disposed slits 32 are punched out of surface 40 by a piercing die in a punch press. Next, a punch press bends the edge of each slit 32 which is to ultimately form the working surface 34 inwardly of the cone to form a louvered surface 42 at a relatively small angle to the conical surface 40, approximately 10° to 15°, as shown in FIG. 3. A conical emery wheel having a radius somewhat smaller than that of surface 40 is then applied off axis to each louvered surface 42 to bevel the inside edge substantially tangent to conical surface 40 to form cutting edge 36 on the inside of louvered surface 42 as shown in FIG. 4.

As shown in FIG. 5, each louvered surface 42 is then bent outwardly of conical surface 40 at a predetermined angle of approximately 10° to 15° to form a series of working surfaces 34 each of which terminates in cutting edge 36. Following this step, the exterior of the working surface 34 may be polished by a large buffing wheel or other polishing apparatus to remove burrs formed during the grinding step. Removal of burrs is especially easy with the present invention as the burrs appear on the exterior of the working surface.

A serrated working surface 34b may next be formed for special applications by forcing working surface 34 against a metal die in a punch press, if desired.

As shown, the method for fabricating an improved cutter cone for a food processing machine has significant advantages over those known in the prior art. The method produces a cutter cone, which having the beveled surface on the inside of the working surface, makes processing of food more efficient. A second advantage is that it is much easier to remove burrs from the cutter cone because the cutting edge is ground from the inside of the working surface.

Although particular embodiments of the invention have been illustrated in the drawings and described herein, it will be understood that the invention is not limited to the embodiments disclosed, but is capable of rearrangement, modification and substitution of parts and elements without departing from the spirit of the invention.

I claim:

1. A method for constructing an improved cutter cone for a food processing machine comprising the steps of:
    cutting a plurality of axially oriented elongated slits in the surface of a frustoconical surface;
    bending one edge of each of the slits internally of the conical surface at a predetermined angle to the surface to form a louvered surface;
    grinding the inside of each of the louvered surfaces to form an inwardly directed working surface and a cutting edge on the interior side thereof;
    bending each of the working surfaces thus formed outwardly of the conical surface at a predetermined angle to the cone; and
    polishing the exterior of each working surface to remove any burrs formed thereon during the grinding step.

2. The method of claim 1 further comprising the step of:
    forming a serrated working surface on the cone by forcing each of the working surfaces against a metal die in a punch press.

* * * * *